United States Patent [19]

Giannetti

[11] 4,126,067

[45] Nov. 21, 1978

[54] TOOL POST

[76] Inventor: Enrico R. Giannetti, 18 Druid Hill Dr., Parsippany, N.J. 07054

[21] Appl. No.: 791,730

[22] Filed: Apr. 28, 1977

[51] Int. Cl.² .................... B23B 29/00; B23B 29/24
[52] U.S. Cl. .................................. 82/36 A; 74/824
[58] Field of Search ............... 82/36 R, 36 A, 36 B, 82/37; 74/824

[56] References Cited

U.S. PATENT DOCUMENTS

| 2,621,396 | 12/1952 | Gracchi | 74/824 |
| 3,422,710 | 1/1969 | Kilmer | 82/36 R |
| 3,461,525 | 8/1969 | Gourley | 82/36 R |
| 3,613,483 | 10/1971 | Cinadr | 74/824 |
| 3,621,736 | 11/1971 | Stanley | 74/824 |

FOREIGN PATENT DOCUMENTS

| 893,943 | 3/1944 | France | 82/36 R |
| 330,218 | 7/1958 | Switzerland | 82/36 A |

*Primary Examiner*—Harrison L. Hinson
*Attorney, Agent, or Firm*—Robert W. Fiddler

[57] ABSTRACT

A selectively adjustable tool post for holding a plurality of tools for rapid and selective positioning of any one of the tools in operative position with respect to a work piece on a machine tool. The tool post is formed with base means preferably formed as a plate adapted for securement at a selective location on a bed portion of the machine tool for any given set-up of the machine tool with respect to the shaping of any particular work piece. A body block is rotatably mounted over the base means, and interlocking means in the form of spline teeth are formed on the surfaces between the body block and base plate. The spline teeth on the body block and the spline teeth on the base plate though biased apart may be selectively forced into engagement by means of selectively actuatable setting means in the form of a handled nut engaging a tube extending from the base plate through the body block, whereby tightening of the nut will force the spline teeth on the block into engagement with the spline teeth on the base plate to fix the block at a selected position. The body block has a plurality of sides formed with undercut channels slideably receiving an undercut projection on a tool holder and a cam is eccentrically positioned and rotatable in the channel to wedge the tool holder in a fixed position, with the tool holder height adjustable in the channel. In use, the tool post body block with one or more tool holders secured in the channels of the block may be quickly and selectively positioned with the tool held by the tool holder arranged to engage the work piece, with release of the setting nut permitting rotation of the body block to bring another tool into a working orientation with respect to the work piece.

8 Claims, 2 Drawing Figures

TOOL POST

BACKGROUND OF THE INVENTION

This invention relates to the art of tool posts for machine tools, and more particularly to an improved tool post adapted to securely hold a plurality of tool holders and tools, with the tool post subject to selective rotation to bring any pre-selected tool into a desired working orientation with respect to the work piece to be operated on, and with the tool being held in a desired fixed position with respect to the work piece upon pre-selected positioning of the tool.

A variety of tool posts have in the past been evolved which hold a plurality of tool holders in which tools for operation on a work piece held on a machine tool such as a lathe, may be held. Such previously evolved multiple tool holding tool posts have served to increase the speed and facility with which any given machining operation may be performed in that the set-up time for positioning any given tool with respect to a work piece may be reduced.

It has, however, been found that the previously evolved multiple tool holding tool posts do not succeed in attaining the desired goal of insuring desired rapid and precise positioning of the tool with respect to the work piece, since such previously evolved tool posts generally employ either no locating means, or a locating pin which must mate with a specific hole at a given setting. If there are no positive locating means, the working forces between the work piece and tool result in undesired movement of the tool, disrupting the desired tool setting. Where locating pins are used to fix the position on the tool post, the time required to effect interengagement of the pin with its mating hole, eliminates the desired time saving advantage of the multiple tool holding tool post. Further, clearances required to permit movement of these previously evolved multiple tool holding tool posts to bring a different tool to a working position, and the clearance required to permit positioning of the tool holders on the post are such that attainment of a desired precision of positioning of the tool with respect to the work piece is not always achieved, so that resetting, and readjustment of any given tool held by the tool post is often required after the tool post is rotated to bring the tool into working position. This need for tool resetting increases as the tool post ages, due to wear between relatively moving parts, increasing the play between these parts.

BRIEF DESCRIPTION OF INVENTION

It is with the above considerations in mind, that the present improved multiple tool holding tool post has been evolved permitting a plurality of tools to be preset at a desired working orientation with respect to any given work piece on a machine tool, and thereafter to be selectively and rapidly moved into a working position without requiring resetting or readjustment of the tools.

It is accordingly among the primary objects of this invention to provide an improved tool post for machine tools, with the post maintaining a plurality of tools in a preset orientation, such that any given tool may be selectively brought into a working orientation with respect to a work piece without requiring subsequent set-up or readjustment of the tool.

A further object of the invention is to provide a tool post holding a plurality of tool holders each of which may be selectively adjusted as to height, even while cutting, and without interferring with the other tool holders held by the tool post.

Another object of the invention is to provide a tool post in which the clearances between the tool holder and body block on the post do not interfere with precision of setting of the tool on the post.

An additional object of the invention is to provide a tool post which engages a tool holder in a positive locked position, eliminating movement of the tool holder once set in a desired position.

It is a further object of the invention to improve the security with which a given tool holder may be engaged by a tool post to minimize the possibility of the working forces between the tool and the work piece upsetting the desired setting of the tool.

An additional object of the invention is to reduce the effects of wear between relatively moving components of a tool post on the accuracy of tool setting obtainable.

It is also an important object of the invention to provide locating means for fixing a rotatable body block on a tool post which does not have to be precisely machined, thereby reducing production costs.

These and other objects of the invention which will become hereafter apparent are achieved by forming the post with base means in the form of a base plate which may be selectively positioned at a fixed location on a machine tool. This base plate is formed with a plurality of radially extending spline teeth, and a tube, the exterior surface of which forms a bearing on which a tool post body block may be selectively rotated. The body block is formed with spline teeth dimensioned to mate with the spline teeth on the base plate to form selectively engageable interlocking means, and a handled quick release setting nut engages a threaded end of the collar tube to clampingly engage the body block between the nut and the base plate to permit the body block to be moved towards the base plate to effect interlocking of the spline teeth. Each side of the body block is formed with an undercut channel dimensioned to slidingly receive and engage an undercut projection on a tool holder, and a cam is positioned on an axis eccentric with respect to the channel axis to move into the channel against a surface of the tool holder projection wedging it to one side of the channel to secure the tool holder to the body block.

In use, the tool post is positioned on a machine tool at a desired location such that each of the tools held by the tool holders supported by the tool post may be brought into operating position with respect to a work piece. The position of the tool held on each face of the tool post body block is adjusted for desired operation on the work piece at the time of initial setup and thereafter by releasing a setting nut, the body block is rotated to bring any preselected tool into working position with respect to the work piece, at which time the setting nut is tightened against the body block to interlock the spline teeth.

A feature of the invention resides in the use of interlocking means comprising spline teeth, a set of which extend from the tool post body block for engagement with a complementary set of spline teeth on the base plate, so that any locking load is distributed over a relatively wide surface area extending over all of the spline teeth, thus minimizing wear of the interlocking means increasing the usable life of the tool post and permitting rapid, precise and secure positioning of any tool held by the tool post with respect to the work piece.

Another feature of the invention resides in the fact that the use of spline teeth instead of previously employed locating pins serves to reduce production costs since the required precision of aligning pins with mating holes is eliminated.

A further feature of the invention resides in the formation of the tool post body block with undercut tool holder receiving channels having a cam which rotates on an axis eccentric with respect to the center line of the tool holder channel so as to exert a wedging action on the tool holder forcing the tool holder to one side of the channel to insure proper positioning of the tool holder in the slot, eliminating random positioning of the tool holder in the channel occurring due to required clearance.

An additional feature of the invention resides in the formation of mating guide projections and grooves between the tool holder and the tool post body block to insure secure and proper positioning of the tool holder on the tool post.

A further feature of the invention resides in the provision of height adjusting means formed by a bearing screw extending through the tool holder into engagement with a bearing surface on the body block to facilitate height adjustment of the tool holder.

BRIEF DESCRIPTION OF THE DRAWINGS

The specific details of the best mode contemplated by the inventor of the manner and process of making and using the invention so as to enable those skilled in the art to make and use same will be described in full, clear, concise and exact terms in conjunction with the accompanying drawings, wherein.

DESCRIPTION OF PREFERRED EMBODIMENT

Figure 1:
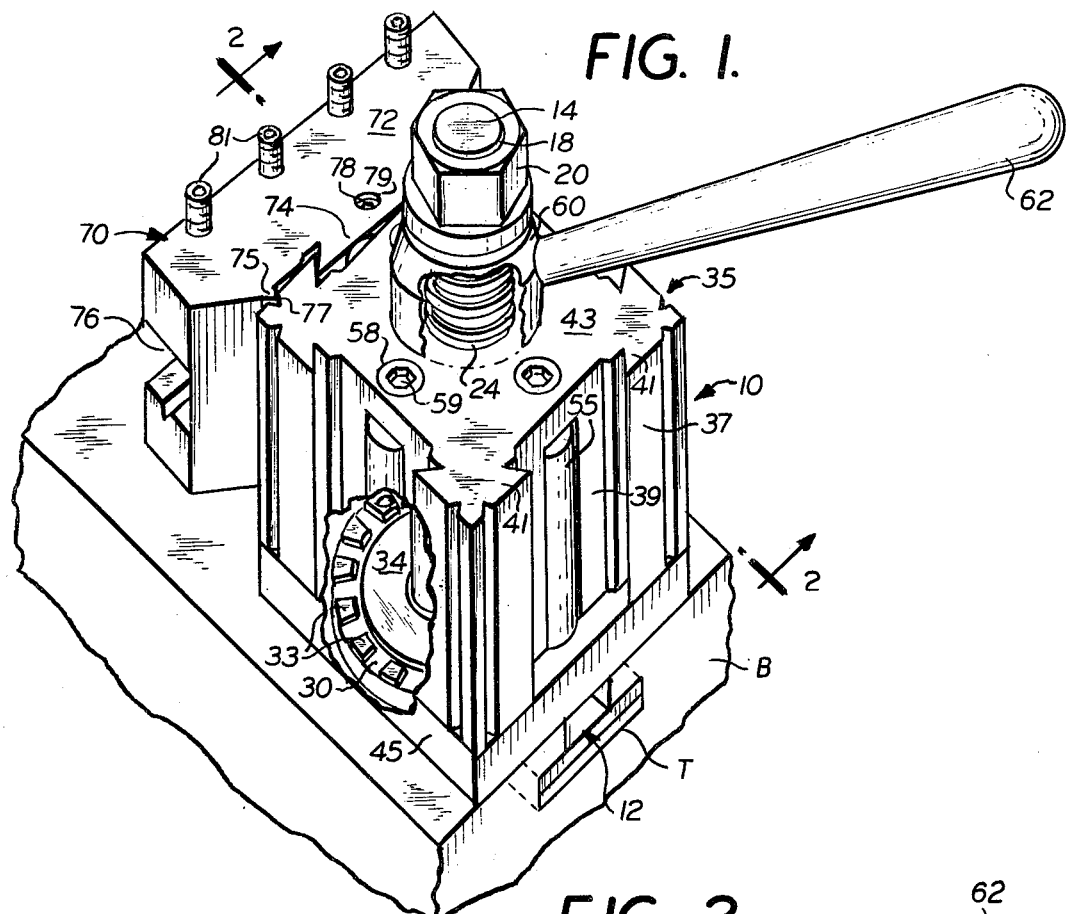
FIG. 1 is a perspective elevational view with parts broken away of the improved tool post made in accordance with the teachings of the invention, showing the tool post mounted on a bed portion of a machine tool, with a single tool holder shown in position, and with parts broken away to illustrate the spline teeth on the base plate.

Referring now more particularly to the drawings, like numerals in the various Figures will be employed to designate like parts. As seen in the drawing, the tool post 10 is shown mounted on the bed B shown schematically in FIGS. 1 and 2 of a machine tool. The bed portion B to which the tool post is attached forms no part of the invention and the term "bed" will be understood by those skilled in the art refer to any portion of a machine tool to which a tool post is normally affixed. As conventional, the bed B is formed with an elongate Tee slot T.

Figure 2:
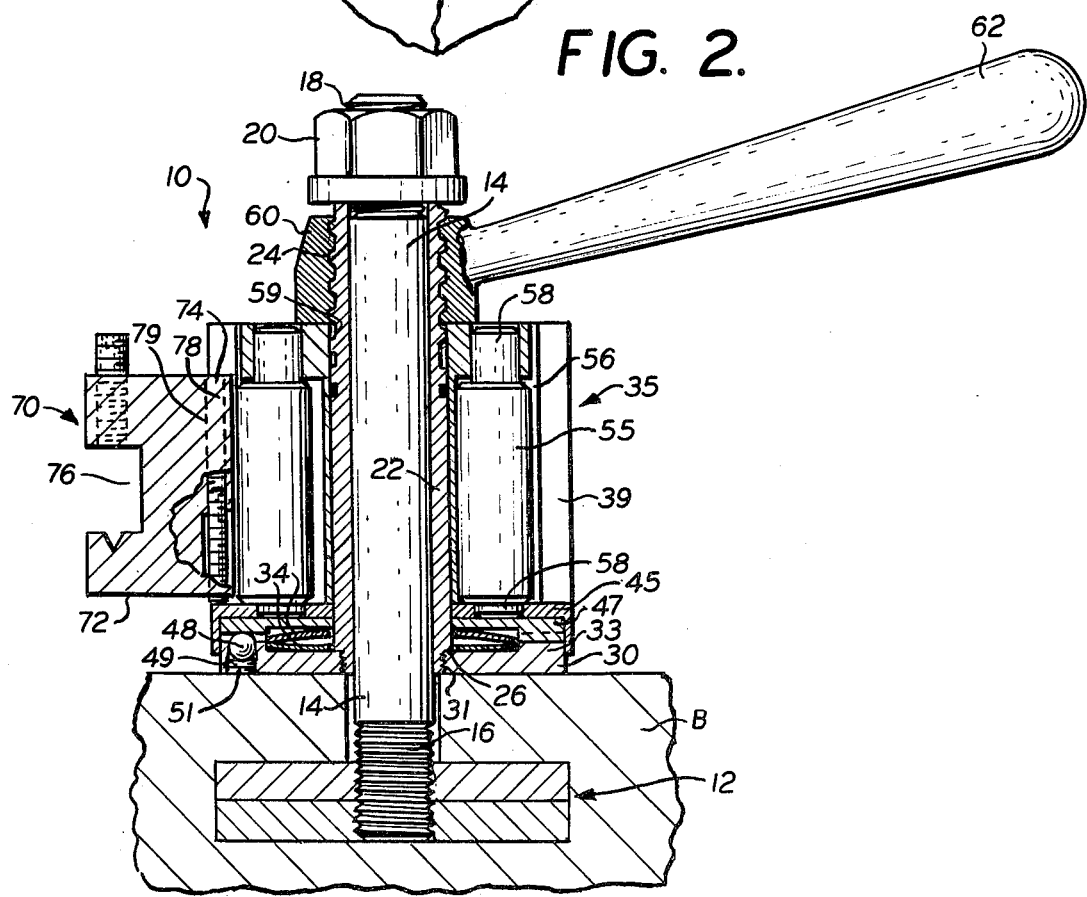
FIG. 2 is a cross-sectional view taken on line 2—2 of FIG. 1 through the tool post.

A Tee-head assembly 12 is provided for free sliding in the Tee slot T. Upstanding from the Tee-head and fixedly joined thereto is a post member 14, as best seen in FIG. 2 with a threaded lower end 16, as viewed in FIG. 2, engaging the Tee-head. The post 14 is also formed with an upper threaded end 18, and assembly nut 20 is engaged therewith.

Mounted on post 14 is a collar tube 22 of a length such as to extend between the top surface of the machine tool bed B and the assembly nut 20. The outer surface of the upper end of collar tube 22 is threaded as at 24, preferably with a relatively coarse thread. The lower end of tube 22, as viewed in FIG. 2, is formed of a reduced diameter to provide a shoulder 26.

Surrounding the collar tube 22 and of a thickness to fit between shoulder 26 and the top of bed B, as viewed at the lower end of FIG. 2, is a base plate 30, which, as seen in the broken away portion of FIG. 1, is of a circular configuration with a central aperture, though as will be apparent to those skilled in the art, other configurations may be employed within the scope of the invention.

Base plate 30 and collar tube 22 are formed as an integral unit, preferably by press fitting the reduced diameter end of the collar tube into the central aperture 31 of the base plate. A plurality of spaced radially extending spline teeth 33 are formed on the base plate 30.

Spring means, preferably in the form of disc spring washers 34 are arranged above plate 30, preferably surrounding the collar tube 22.

A tool post body block 35 is rotatably mounted on collar tube 22 above base plate 31. Body block 35 is illustratively shown of a rectangular configuration, square in horizontal cross-section. However, as will be apparent to those skilled in the art, the horizontal cross-section may be formed with a multiplicity of sides other than provided by the square configuration so that the horizontal cross-section may be pentagonal, hexagonal, etc., depending on the number of tools which it is desired to accommodate. In the four-sided square configuration illustrated, four tools may be accommodated. To this end, each side 37 of the body block, only one of which will here be described, is formed with an undercut channel 39 having overhanging edges 41. Channel 39 is open at the top face 43 of block 35, and closed at base portion 45 of block 35. The base portion 45 is formed with spline teeth 47, as best seen in FIG. 2, complementary to the spline teeth 33 on base plate 31. The complementary relationship between the spline teeth 47 on the block base portion 45 and the spline teeth 33 on the base plate are such that the spline teeth may intermesh to prevent relative rotation between the body block 35 and the base plate 31.

To insure that the teeth of the base plate are oriented between the teeth of the block base, biasing means in the form of a spring pressed ballbearing 48 upwardly urged by spring 49 are held in a recess in plate 30 by set screw 51 with the ball 48 urged upwardly from the tooth face of one of the spline teeth 33 on base plate 31, so that if a tooth face of the block base is opposite the tooth face of the base plate, the ball 48 will tend to urge the tooth of the block base into a valley between the teeth 33 on the base plate.

A cam 55 formed by a cylindrical rod rotatably positioned on an eccentric axis is arranged in a cam chamber 56 opening to tool holder receiving channel 39. The cam 55 is held in the cam chamber 56 of body block 35 by means of journals 58 at opposed ends of the cam cylinder 55, as best seen in FIG. 2. The upper journal 58 extends through the upper surface 43 of the body block 35, and is preferably formed with an allen head recess 59 to permit rotation of the cam cylinder 55 by means of an allen head wrench. Obviously, cam rotation may be effected by a variety of means other than use of an allen head wrench within the scope of the invention. The cam 55 is mounted on an axis which is offset with respect to the longitudinal axis of channel 39, so that the cam lies closer to one edge of the channel than to another, so as to exert a wedging action forcing the tool holder received in the channel to one side of the channel, as will be made hereafter more apparent.

The above described and illustrated channel cam arrangement, as will be understood by those skilled in the art, is provided on each face of the body block 35. A central aperature 59 is formed in the body block 35 of a diameter such as to permit journalling of the body block on collar tube 22 to provide free rotation of the body block on the collar tube 22.

Sandwiched between the block base portion 45 of the body block 35, and the spline face of base plate 31 are the disc spring washers 34, of sufficient number so that in the absence of pressure on the body block 35 spring washer 34 can support the weight of the body block 35 at a level spaced from the base plate 30 such as to permit the block spline teeth 47 to freely ride over the base plate spline teeth 33.

A quick release setting nut 60 is threaded on the upper threaded end 24 of collar tube 22. Setting nut 60 is preferably formed with a handle 62 to implement quick turning of the nut 60. The height of nut 60 is such as to fit between the lower end of assembly nut 20 and the upper surface 43 of body block 35, with a clearance at least equal to the height of the stacked disc washers 34 (when unstressed except for the weight of block 35) which is equal to or slightly greater than the height of the spline teeth, so that when the setting nut 60 is at the uppermost position beneath the lower surface of adjusting nut 20 the disc washer 34 will raise the body block a distance such that the block base spline teeth 47 will not be engaged by the base plate spline teeth 33 and may freely move thereover.

A single tool holder 70, as seen to the left in the drawings, is shown in position on the body block. Tool holder 70 is formed with body portion 72 having an undercut projection 74 one one side and a tool receiving channel 76 extending axially along the other side of the tool holder body. Undercut slide projection 74 is contoured and dimensioned to provide a slide fit of the slide projection 74 in body block channel 39. Arranged at a spaced distance from, and on each side of, slide projection 74 is a guide projection 76 (only one of which is shown), which fits into guide groove 72 (one for each projection) formed on opposed sides of slide channel 29.

In order to permit selective adjustment of the height of the tool supported by the tool post with respect to the work piece, a height adjusting bearing screw 78 is threadly extended through threaded opening 79 in slide projection 74, with the lower end of the bearing screw bearing against the closed lower end of the bearing screw bearing against the closed lower end of channel 39 formed by the upper surface of block base portion 45. In the illustrated embodiment, the upper end of height adjusting screw 78 is preferably formed with an allen head socket.

Securement of desired tools in tool receiving channel 76 of the tool holder is effected by means of allen head screws 81 threaded into the tool holder body 72 and extending into the channel 76.

OPERATION

The aforedescribed components are fabricated in accordance with conventional metal working techniques by casting, machining and the like, with the components assembled as described and illustrated. The body block base portion is preferably made as a unit separate from the rest of the block so that the cam 55 may be positioned in the cam chamber 56 block. Additionally, the spline teeth 47 on the body block may more easily be formed on a separate plate secured to the base portion 45, than if the teeth 47 have to be formed directly on the body block.

In use, the tool post 10 is affixed to the bed B of a machine tool in connection with which the tool post 10 is to be employed by positioning the Tee-head of Tee-head assembly 12 in the conventional Tee-slot found in such beds B. The assembled tool post 10 is mounted by sliding collar tube 22 over the post 14 of the Tee bolt and assembly nut 20 is tightened on the free end of the post against collar tube 22 to sandwich and securely maintain the collar tube 22 and base plate 30 between the nut 20 and the bed B.

Thereafter, desired tools are positioned in the tool holder channels 76 with their cutting or forming edges extending a distance from the tool holder such as to permit them to be brought against the work piece. Tool holder set screws 81 are tightened to securely engage the tool in the channel, and the height of the tool set by adjusting bearing screw 78.

The tool holders 70 are secured in the selected position with respect to the block 35 by rotating cams 55. It will be noted that the position of the tool holders 70 in the channels 39 are subject to relatively precise positioning, not subject to the inaccuracies of setting produced by the clearances required to permit free sliding of the tool holder in the channel by virtue of the wedging action produced by the eccentric location of the axis of the cam cylinder with respect to the channel axis so that the tool holder is always wedged to one side of the channel. Further, precise location of the tool holder 70 with respect to block 35 is attained by the interengagement of guide projection 76 in guide groove 77.

Height adjustment of any tool held by the tool post, may readily be accomplished at any time by turning height adjusting screw 78, the lower bearing end of which bears on the upper surface of block base portion 45, as best seen to the left in FIG. 2, with the degree of penetration of the screw 78 through tool holder body 72 determining the height of the tool holder (and any tool held thereby) with respect to the block and the machine bed.

After desired set-up on a given machine tool, turning handle 62 to move setting nut 60 away from the top of body block 35, permits disc springs 34 to move the block upwardly, disengaging block spline teeth 47 from base plate spline teeth 33, at which time the block 35 and its associated tool holders and tools may be freely rotated to bring any desired tool into an operative position with respect to the work piece on the machine tool. Since the tool position has been set at a desired orientation, at the time of initial set-up, no further adjustment is generally required. Handle 62 is then rotated to bring setting nut 60 against the top 43 of block 35 forcing the block against the biasing action 35 forcing the block against the biasing action of disc spring 34 to cause the block spline teeth 47 to mesh with base plate spline teeth 33. Ball bearing 48, as above described serves to insure the positioning of teeth 47 between teeth 33 and not in face to face engagement.

The distribution of the load among the many spline teeth serves to reduce wear, and thus promotes accuracy of location upon resetting. Further, the spline teeth provide for a rapid, precise locking of the body block in a selected position without requiring any time consuming manipulation.

The above disclosure has been given by way of illustration and elucidation, and not by way of limitation, and it is desired to protect all embodiments of the invention within the scope of the appended claims.

What is claimed is:

1. A selectively adjustable tool post for holding a plurality of tools for selective positioning of any one of the tools in operative position with respect to a work piece on a machine tool, said tool post comprising:

a base plate adapted for fixed securement at a selected location on the machine tool;

a body block having a plurality of sides, said block rotatably mounted adjacent said base plate;

interlocking means extending from said body block and said base plate, said interlocking means comprising spaced spline teeth arranged on radii extending from the center of rotation of said body block, with a set of spaced spline teeth on said block interengaging a set of spline teeth on said base plate;

ball means on the face of one of the teeth of said spline teeth to cause the teeth of one set of teeth to roll off the face on the other set of teeth into the valleys between the teeth;

setting means selectively operable to effect engagement and disengagement of said interlocking means; and means for supporting a tool on each side of said body block.

2. A tool post as in claim 1 in which said interlocking means comprise spaced spline teeth arranged on radii extending from the center of rotation of said body block, with a set of spaced spline teeth on said block interengaging a set of spline teeth on said base plate.

3. A tool post as in claim 2 in which ball means are provided on the face of one of the teeth of said spline teeth to cause the teeth of one set of teeth to roll off the face of the other set of teeth into the valleys between the teeth.

4. A selectively adjustable tool post for holding a plurality of tools for selective positioning of any one of the tools in operative position with respect to a work piece on a machine tool, said tool post comprising:

a base plate adapted for fixed securement at a selected location on the machine tool;

a body block having a plurality of sides, said block rotatably mounted adjacent said base plate;

interlocking means extending from said body block and said base plate;

setting means selectively operable to effect engagement and disengagement of said interlocking means; and means for supporting a tool on each side of said body block comprising:

an undercut channel on each side of said block;

a tool holder having an undercut projection dimensioned to fit slideably into said channel; and a cam rotatably mounted for movement into said channel against said tool holder projection.

5. A tool post as in claim 4 in which said cam is mounted on an axis of rotation offset with respect to the axis of said channel, whereby said projection will be wedged to one side of said channel when said cam is rotated against said tool holder projection.

6. A selectively adjustable tool post for holding a plurality of tools for selective positioning of any one of the tools in operative position with respect to a work piece on a machine tool, said tool post comprising:

a tool holder;

an undercut projection on said tool holder;

a rotatably mounted body block having a plurality of sides;

an undercut channel on each side dimensioned to slideably receive said undercut projection on said tool holder;

a cam rotatably mounted for movement into said channel on each side of said body block against said projection on said tool holder, the axis of rotation of said cam being offset with respect to the axis of said channel whereby said projection will be wedged to one side of said channel when said cam moves; and means for selectively rotating said cam.

7. A tool post as in claim 6 in which said channel is formed with a closed end; and a screw having a bearing end is threaded through said tool holder with the bearing end abutting the closed end of said channel, whereby the degree of insertion of said tool holder projection in said channel may be selectively varied.

8. A tool holder as in claim 6 in which a guide groove mating with a guide projection is formed between said tool holder and a side of said body block.

* * * * *